US009079804B2

(12) United States Patent
Erro et al.

(10) Patent No.: US 9,079,804 B2
(45) Date of Patent: Jul. 14, 2015

(54) METHOD FOR PREPARING PHOSPHATE COMPOUNDS (75) Inventors: Javier Erro, Pamplona (ES); Roberto Baigorri, Huarte/Uharte (ES); Jose Garcia-Mina, Iza (ES); Jean-Claude Yvin, Saint Malo (FR)

(73) Assignee: CENTRE MONDIAL D'INNOVATION, Saint-Malo (FR)

( * ) Notice: Subject to any disclaimer, the term of this patent is extended or adjusted under 35 U.S.C. 154(b) by 253 days.

(21) Appl. No.: 13/519,663

(22) PCT Filed: Jan. 4, 2011

(86) PCT No.: PCT/FR2011/050011
§ 371 (c)(1),
(2), (4) Date: Jan. 3, 2013

(87) PCT Pub. No.: WO2011/080496
PCT Pub. Date: Jul. 7, 2011

(65) Prior Publication Data
US 2013/0104612 A1 May 2, 2013

(30) Foreign Application Priority Data
Jan. 4, 2010 (FR) .................................... 10 50009

(51) Int. Cl.
C05B 1/02 (2006.01)
C05B 1/04 (2006.01)
C05B 11/04 (2006.01)
C05B 17/00 (2006.01)
C05F 11/02 (2006.01)

(52) U.S. Cl.
CPC ... C05B 1/02 (2013.01); C05B 1/04 (2013.01); C05B 11/04 (2013.01); C05B 17/00 (2013.01)

(58) Field of Classification Search
CPC ............ C05B 1/02; C05B 1/04; C05B 11/04; C05B 17/00; C05F 11/02
USPC ....................................................... 71/31–53
See application file for complete search history.

(56) References Cited

U.S. PATENT DOCUMENTS 620,443 A 2/1899 Washington
1,048,454 A 12/1912 Charles
(Continued)

FOREIGN PATENT DOCUMENTS

BE 472 862 4/1947
FR 591 851 7/1925
FR 945 961 5/1949

OTHER PUBLICATIONS

Yue Ting-Sheng et al., "Absorption and . . . earth coal", Uranium mining and metallurgy, vol. 19, No. 4, Nov. 2009, and it's English translation.
Matsumoto Yoshio, "Manufacturing of . . . inorganic acids", Chemical Abstracts, vol. 115, Apr. 9, 1991, XP000751202.
(Continued)

Primary Examiner — Jennifer A Smith
(74) Attorney, Agent, or Firm — Clark & Brody (57) ABSTRACT The invention relates to phosphate compounds obtained according to a method comprising reaction of a source of insoluble phosphate with an organic source, principally of vegetable origin, optionally in the presence of a mineral acid or an organic acid, said organic source having at least 10% of complexing functional groups.
The compounds of the invention are useful for preparing fertilizer.

16 Claims, 1 Drawing Sheet

(56) References Cited

U.S. PATENT DOCUMENTS

| | | |
|---|---|---|
| 1,668,464 A | 5/1928 | Lloyed |
| 6,060,074 A * | 5/2000 | Butler et al. ............ 424/405 |
| 2008/0121006 A1* | 5/2008 | Prasad .................. 71/24 |
| 2013/0104612 A1* | 5/2013 | Erro et al. ............. 71/24 |

OTHER PUBLICATIONS

Yue, Tingsheng ; MA, Peilan: "Study on . . . nitrogen and phosphorus", Chemical Abstracts, vol. 130, 1998 XP000186795.

* cited by examiner

METHOD FOR PREPARING PHOSPHATE COMPOUNDS

The present invention relates to phosphate compounds and use thereof as fertilizer in agriculture.

Phosphorus is an important macronutrient for plants and can represent up to 0.2% of dry matter.

It is a component of key molecules such as nucleic acids, phospholipids and ATP. Inorganic phosphorus is also involved in the control of various enzymatic reactions as well as in the regulation of many metabolic pathways.

Consequently, plants cannot develop without a minimum supply of phosphorus.

After nitrogen, phosphorus is the second macronutrient most frequently limiting for plant growth.

Even if the total phosphorus concentration in a soil is generally high, it is often present in forms that are not available, or in forms that are only available outside of the rhizosphere. In general, these forms are iron phosphates and aluminum phosphates in acid soils, and calcium phosphates in calcareous soils.

Without application of fertilizer, the rapid salting out of phosphorus in soils is very often insufficient to support the development of agricultural plants. In fertilized soils, more than 80% of the phosphorus is immobilized and unavailable to the plants, because it is adsorbed, precipitated and/or converted to an organic form.

Many studies have noted the close relationship between phosphorus bioavailability in soils and the concentration of soil organic matter (SOM). Other studies have shown the benefit of organic fertilizers (OFs) both for the availability of phosphorus and its absorption by the plant in different types of soils.

Soil organic matter (SOM) and organic fertilizers (OFs) act on the phosphorus dynamics of the soil notably by increasing the microbial and enzymatic activities of the soil, but other more direct mechanisms of SOM and OFs may also play an important role in their action on the phosphorus dynamics of the soil.

Thus, the effectiveness of mixtures of phosphate and organic matter for improving the phosphorus availability forms the basis of many works. For example, various patent documents describe mixing phosphate fertilizers, mainly superphosphates, with organic matter or humic substances (U.S. Pat. No. 3,617,237; U.S. Pat. No. 7,001,869, RU 2108996; CN1212249).

In general, these documents describe a physical mixing of organic matter or of humic substances with phosphate fertilizers that are already prepared, prior to said mixing.

These mixtures certainly have beneficial effects on phosphorus availability but they are not entirely satisfactory. In fact, among the various mechanisms for protecting phosphorus from retrogradation in soils, the formation of stable phospho-organic complexes is one of the most effective. Now, the phosphate fertilizers described in the prior art do not actually consist of said complexes, but act by other mechanisms that are indirect and therefore less effective (Delgado, A. et al., 2002, *Plant Soil*, 245, 277-286).

It is in this context that the inventors set themselves the objective of preparing phosphate compounds that make it possible to supply phosphorus with improved availability.

In general, phosphate fertilizers are produced by adding acid(s) to a source of insoluble phosphate (generally in the form of crushed or pulverized phosphate rock).

Different phosphate fertilizers are obtained, depending on the acid or mixture of acids used:
  if sulfuric acid is used, there is formation of compounds called simple or single superphosphates (SSP), which are characterized by a $P_2O_5$ content from 16 to 22%;
  if phosphoric acid is used, there is formation of compounds called triple superphosphates (TSP), which contain from 43 to 48% of $P_2O_5$;
  if a mixture of sulfuric acid and phosphoric acid is used, phosphate fertilizers called double superphosphates (DSP) are obtained, which contain from 28% to 35% of $P_2O_5$.

Other acids may also be used, but less often. An example is nitric acid, which leads to the formation of nitrophosphates.

The inventors discovered, unexpectedly, that the presence of complexing compounds extracted from organic matter, and in particular the presence of humic substances, during the reaction of acid attack on a source of insoluble phosphate makes it possible to obtain phosphate compounds in which the phosphate remains soluble even if it is concentrated.

In the compounds prepared according to the invention, the phosphate is present in a form that is directly available and usable by the plants. Thus, the phosphate compounds according to the invention contain phosphate that is protected from retrogradation. The invention therefore finds application quite particularly for preparing phosphate fertilizers that are prepared by acid attack on a source of insoluble phosphate.

The inventors have in fact shown that the main advantage of the organophosphate compounds prepared according to the invention is that this method permits the formation of stable organo-calcium-phosphate complexes. These complexes are supramolecular associations composed of organic macromolecules, which are bound to the phosphate by the formation of calcium bridges. Thus, the presence of complexing organic entities makes it possible to protect the phosphate from precipitation by formation of insoluble salts in water with iron, aluminum or calcium.

Document CN 1223986-1999 describes the simultaneous reaction of phosphate rocks with sulfuric acid and a lysine-rich organic residue (product from lysine manufacture). However, owing to the considerable presence of lysine and amine analogs in the organic residue used in the reaction, the amine end group forms bridges (or amides) with the carboxyl groups of the organic matter, which blocks the complexation sites and prevents the formation of organo-calcium-phosphate complexes (this is described by Terashima et al., 2007, *Chemosphere*, 69, 240-246).

The present invention is employed for preparing phosphate compounds from an insoluble source of phosphorus and preferably phosphate rocks. For example, the invention makes it possible to obtain phosphate compounds such as nitrophosphates, and single, double or triple superphosphates.

According to a first aspect, the present invention therefore relates to phosphate compounds that are obtainable, or even obtained or directly obtained, according to a method of preparation comprising reaction by acid attack on a source of insoluble phosphate with an organic source, optionally in the presence of one or more mineral acid(s) or of one or more organic acid(s), characterized in that said organic source consists of:

a) raw organic matter selected from lignite, leonardite, peat, plant composts, lignosulfonates not containing monovalent cations and algae, which is pretreated by a step of activation consisting of liberating at least 10% of the complexing functional groups present in the organic compounds, or b) organic compounds extracted from lignite, leonardite, peat, from plant composts, from lignosulfonates containing monovalent cations or from algae, and which possess at least 10% of free complexing functional groups.

In the compounds obtained according to this method of preparation, the phosphate is protected from retrogradation through the formation of stable organo-calcium-phosphate complexes, which cannot be obtained if the organic compounds with complexing capacity are not treated beforehand to liberate the complexing functional groups present in the organic matter used. In these organo-calcium-phosphate complexes, the phosphate is protected notably against reaction with iron, aluminum or calcium for example, which leads to the synthesis of phosphate compounds that are precipitated and are not directly usable by the plants.

According to the present invention, "complexing functional groups" means any functional group able to form complexes with metals. These complexing functional groups are carboxyl, phenol and hydroxyl groups, for example.

The number or the proportion of free complexing functional groups can be measured by various techniques that are well known by a person skilled in the art, for example by potentiometry or by gravimetry. For example, the carboxyl complexing functional groups can be analyzed by potentiometry, which makes it possible to determine, for example, the residual free acidity of organic compounds in solution corresponding to the acidity titratable with sodium hydroxide up to the pH of the equivalent point. It is obtained by plotting the titration curve of said organic solution with a titrated solution of sodium hydroxide and determining, from this curve, the equivalent volume of titrant solution. This method is notably described by Dr. William Horwitz and Dr. George Latimer, in "*The* 18*th Edition, Revision* 3, *Official Methods of Analysis*$^{SM}$ (AOAC), 2007, Jr. Editors".

The present invention therefore differs from the phosphate compounds of the prior art obtained notably by simultaneous mixing of raw organic matter (not submitted to a pretreatment or activation step), of phosphate rock and of acid or of preliminary mixing of phosphate rock and organic matter followed by addition of the acid. The application of these methods cannot lead to the formation of organo-calcium-phosphate complexes since the complexing functional groups of the compounds present in the organic matter are not free to react and to permit formation of these complexes, which protect the phosphate from retrogradation.

In the context of the invention, the use of raw organic matter, i.e. as it is in the natural state, requires a step of pretreatment in order to liberate the complexing functional groups of the organic compounds and permit the formation of organo-calcium-phosphate complexes during reaction with insoluble phosphate (case a)). In fact, these complexing functional groups are, in organic matter in the natural state, blocked by the formation of metal complexes or bonds or interactions between groups, such as hydrogen bridges or hydrophobic effects. This pretreatment can thus be described as an activation step of the raw organic matter to obtain a complexing organic source, ready to react with the source of insoluble phosphate.

The liberation of the complexing functional groups, which takes place during the activation step by destruction of the metal complexes or of the inter-functional bonds, obtaining at least 10% of free complexing functional groups, can be carried out by means of an acid, mineral or organic, or a mixture of said acids, or an alkaline solution, optionally with addition of a chelating agent such as pyrophosphates, synthesis chelates (EDTA, DTPA), and the like.

Thus, in the case when an organic source is used in the raw state (case a)), the phosphate compounds of the invention can be defined as being obtainable, or even obtained or directly obtained, by a method of preparation comprising reaction by acid attack on a source of insoluble phosphate with an organic source, optionally in the presence of a mineral acid or an organic acid, characterized in that said organic source consists of organic matter in the raw state selected from lignite, leonardite, peat, plant composts, lignosulfonates not containing monovalent cations and algae, and is pretreated by means of an acid, mineral or organic, or an alkaline solution optionally with addition of a chelating agent, in order to liberate at least 10% of the complexing functional groups present in the organic compounds.

Among the acids that can be used for activation of the raw organic matter, we may notably mention:
- mineral acids such as sulfuric acid, phosphoric acid, nitric acid, hydrochloric acid or mixtures thereof, preferably sulfuric acid, phosphoric acid or mixtures thereof;
- organic acids such as citric acid, oxalic acid, acetic acid, maleic acid, malonic acid, succinic acid, malic acid, fumaric acid, tartaric acid, pyruvic acid, oxaloacetic acid, ketogluconic acid, butyric acid, propanoic acid or mixtures thereof, preferably oxalic acid, citric acid or mixtures thereof.

Among the alkaline solutions that can be used for activation of the raw organic matter, we may notably mention sodium, ammonium or potassium hydroxide or mixtures thereof. This alkaline solution can optionally be used in the presence of a chelating agent such as pyrophosphates, synthesis chelates (EDTA, DTPA), and the like.

To carry out activation of the raw organic matter before proceeding to the reaction by acid attack of the source of insoluble phosphate, it is also possible for example first to prepare a suspension of the organic matter in water, then mix it with the acid (sulfuric, phosphoric, etc.) or the alkaline solution.

During this step of activation of the raw organic matter, the temperature is generally between about 5° C. and about 100° C., preferably between about 10° C. and about 60° C., and more preferably between about 20° C. and about 40° C. Moreover, the reaction is carried out for a minimum of 1 minute, preferably for at least about 5 minutes, and especially preferably for at least 15 minutes.

The activation step results in a so-called "activated" organic matter, which contains compounds in which at least 10% of the complexing functional groups are free. These functional groups are advantageously selected from carboxyl groups, phenol groups and hydroxyl groups. Preferably, the compounds obtained contain at least 30% of free complexing functional groups.

After activation and before proceeding to the reaction by acid attack of the source of insoluble phosphate, the organic matter can therefore be in liquid form, for example in the form of a solution or a suspension containing the organic matter and the activating solvent, or else in solid form if for example the organic matter is dried once it is "activated".

According to the present invention, the phosphate compounds can thus be obtained by a method that comprises various steps depending on the form of the organic source that is used.

When the organic source used consists of organic matter in the raw state, i.e. just as it is in the natural state, liberation of the complexing functional groups present in the organic matter is carried out prior to the reaction of acid attack with the source of insoluble phosphate (case a)).

When the organic source used for carrying out the invention is not raw organic matter, but consists of organic compounds that have been extracted from raw organic matter and in which at least 10%, and preferably at least 30% of the complexing functional groups are already free, the preliminary activation step of the organic source used for preparing the phosphate compounds according to the invention is not necessary in this case since the complexing functional groups are already free (case b)).

For example, compounds that contain about 30% of carboxyl groups, 15% of phenol groups and 10% of alcohol (or hydroxyl) groups can be used for carrying out the invention.

Organic compounds of this type may be commercially available, for example potassium or sodium humates marketed under the name Fortehum®, or lignosulfonates with monovalent cations marketed under the name Novibond® or Borresperse®; these products contain at least 70% of free complexing functional groups.

Consequently, the use of any organic source, mainly of vegetable origin, whether or not raw, which contains compounds that have at least 10% of complexing functional groups able to form complexes with metals, can be used for preparing the phosphate compounds of the present invention.

The lignosulfonates or sulfonated lignin (CAS No. 8062-15-5) are water-soluble anionic polyelectrolyte polymers that are byproducts from the production of wood pulp that uses bisulfite pulp.

Regarding the use of lignosulfonates, the activation step may or may not be carried out, depending on the precise nature of these compounds. In fact, the activation step is not necessary for lignosulfonates whose complexing groups are free, namely lignosulfonates with monovalent cations, for example inorganic sodium, potassium, or ammonium salts, whereas the use of other types of lignosulfonates, for example inorganic calcium or iron salts, will require carrying out an activation step prior to the reaction with the insoluble phosphate.

The algae that can be used as organic source in the method of the invention are notably algae of the type Phaeophyceae, Rhodophyceae or Chlorophyceae, whose available biomass is widely accessible. These algae can be used in the form of dry powder obtained after drying and grinding of previously dried algae, in the form of moist paste obtained after grinding, micro-grinding and/or micro-disruption of fresh algae, and/or in the form of aqueous extract obtained by basic or acid hydrolysis of algae, dry or fresh; this hydrolysis step, which is carried out in the presence or in the absence of complexing agents, provides liberation of the complexing functional groups of organic matter of algal origin.

Preferably, the organic source used in the context of the present invention is of vegetable origin.

The commonest organic sources, such as peat, leonardite, lignite and plant composts are preferably used in the context of the present invention, whether in the raw state (case a)) or as organic matter from which the organic compounds whose complexing functional groups are free are extracted (case b)). These types of organic matter are particularly preferred as organic source in general (case a)) and/or case b)) as they are notably rich in humic substances, and in particular in humic acids. Thus, raw organic matter from which the organic compounds used are extracted, which contains at least 5% of humic substances, preferably at least 10% of humic substances and especially preferably at least 40% of humic acids (percentages expressed in dry matter), will preferably be used.

The organic source that is preferred according to the invention is peat.

These types of organic matter can be used raw in the context of the invention, and will in this case need to undergo the activation step before being used for preparing the phosphate compounds of the invention (case a)). Thus, according to a particularly advantageous embodiment of the present invention, peat will be used in the raw state as natural organic source containing humic substances, and in particular humic acids.

Humic substances extracted from these organic materials can also be used without requiring activation prior to being used in the reaction according to the present invention, since the method of extraction leads to liberation of the complexing functional groups present in the humic substances (case b)). The humic substances can notably be extracted and optionally purified by methods that are well known by a person skilled in the art (Stevenson, 1994, *Humus Chemistry*, Second Edition, Wiley, New York).

The humic substances (HS) are pigmented polymers that constitute the principal elements of humus, which represents the natural organic matter in the soil (SOM), in water and in geological organic deposits such as lake sediments, peats, lignites and schists. They are largely responsible for the brown color of decomposed plant debris and also contribute to the brown-black color of the surface of soils. The HS are therefore very important components of the soil as they affect its physical and chemical properties and increase soil fertility. In aquatic systems, such as rivers, HS make up about 50% of the dissolved organic matter, and affect the pH and alkalinity.

The HS are complex, heterogeneous mixtures of polydispersed materials formed by chemical and biochemical reactions during the decomposition and transformation of plants and microbial residues, which result from a process known as humification. The lignin of plants and its products of transformation, as well as polysaccharides, melanin, cutin, proteins, lipids, nucleic acids, fine particles of carbonization residues, are important compounds taking part in this humification process.

These substances, which are of heterogeneous, complex composition, can be divided into three main fractions, humic acids (HA or HAs), fulvic acids (FA or FAs) and humin, and into subfractions (glucic acid, ulmic acid, apocrenic acid, hymatomelanic acid etc.) according to various criteria such as their acidity, their color, their solubility, etc.

The following scheme is a representation of the physicochemical properties of humic substances according to Stevenson, F. J., 1994. *Humus Chemistry*, Second Edition, Wiley, New York.

| Humic substances | | | | |
|---|---|---|---|---|
| Fulvic acids | | Humic acids | | Humin |
| Pale yellow | Yellowish brown | Dark brown | Gray-black | Black |
| ⎯⎯⎯⎯⎯⎯⎯⎯ increase in color intensity ⎯⎯⎯⎯⎯⎯⎯⎯➤ | | | | |
| ⎯⎯⎯⎯⎯⎯⎯⎯ increase in degree of polymerization ⎯⎯⎯⎯⎯⎯⎯⎯➤ | | | | |
| 2000 ⎯⎯⎯⎯ increase in molecular weight ⎯⎯⎯ 300 000 ➤ | | | | |
| 45% ⎯⎯⎯⎯⎯ increase in carbon content ⎯⎯⎯⎯ 62% ➤ | | | | |
| 48% ⎯⎯⎯⎯⎯ decrease in oxygen content ⎯⎯⎯⎯ 30% ➤ | | | | |
| 1400 ⎯⎯⎯⎯ decrease in exchange of acidity ⎯⎯⎯ 500 ➤ | | | | |
| ⎯⎯⎯⎯⎯⎯⎯⎯ decrease in solubility ⎯⎯⎯⎯⎯⎯⎯⎯➤ | | | | |

The HS contain aromatic and polyaromatic groups (including heteroatoms) and C═C conjugated double bonds in aliphatic residues, acid groups, mainly phenol and carboxyl groups, carbonyls and sugars. They also contain stable free radicals. The molecular weight of the HS is between 2000 and 300 000 dalton.

The distribution of the principal elements of the HS, obtained by elemental analysis, is as follows: C (35-60%); O (30-50%); H (3-8%); N (0.3-4%); S (0.1-4%). The distribution of the functional groups and structural domains, analyzed by $^{13}$C NMR and expressed as percentage of total carbon, is as follows: aliphatic unsaturated (5-50%); N-alkyl methoxy (0.5-15%); carbohydrates (10-50%); aromatic (5-50%); carboxylic (5-30%); ketonic (1-15%); phenol (3-10%).

Although the structure and the precise properties of a given sample of HS depend on the source of the soil and water and on the specific conditions of extraction, the average properties of HAs, FAs and humin of different origins are nevertheless remarkably similar.

The HS can be extracted from organic matter (peat, leonardite, soils, composts of animal and vegetable waste etc.) using an alkaline agent such as sodium hydroxide (NaOH) or potassium hydroxide (KOH). The alkaline organic extract thus obtained can then be separated by acidification into HAs (soluble in water at alkaline pH but insoluble at acid pH), FAs (soluble in water at any pH), and humin (residue that is insoluble in water at any pH). In fact, in contrast to the FAs, the HAs are precipitated on adding a strong acid (for example adjusted to pH 1 with HCl). Humin cannot be extracted, neither with a strong base, nor with a strong acid. The HAs can also be further separated into gray HAs (insoluble at neutral pH and ionic strength above 1 M) and brown HAs (soluble at neutral pH and ionic strength above 1 M).

The aquatic HS only contain HAs and FAs and these compounds are generally removed from water by lowering the pH to 2 and adsorption of these compounds on a column of suitable resin, for example an adsorbent resin of polymeric nature marketed under the name Amberlite® XAD. The HAs and FAs are extracted from the resin with a strong base, then the pH is lowered to 1 to precipitate the HAs. Separation on a column of resin (for example an adsorbent resin of polymeric nature of the XAD type) is also used for separating the FAs from nonhumic material extracted from soils, such as amino acids, peptides, sugars, etc. At acid pH (3-4), the FAs are adsorbed on the resin whereas the nonhumic material passes through the column.

In addition to these HS of natural origin, it is also possible to use synthetic HS (humic acids, fulvic acids, oxidized humic substances such as oxy-humic and oxy-fulvic acids, etc.). Moreover, the humic substances can result from a synthesis process (Hanninen et al., 1987, *The Science of the Total Environment*, 62, 201-210) or from transformation of natural humic substances, notably by hemisynthesis. These various HS can be used individually or else as mixtures of several types of HS.

Any of the fractions of humic substances can be used in the context of the invention. Preferably, humic acids and/or fulvic acids are used, and even more preferably only humic acids. The organic source used for preparing the phosphate compounds according to the invention can in particular comprise the brown fraction and/or gray fraction of the humic acids.

For preparing the phosphate compounds according to the invention, the source of insoluble phosphate can be any product, preferably of natural origin, containing insoluble phosphate, such as phosphate rocks (i.e. apatite, struvite, vivianite or corresponding synthetic phosphates), byproducts of animal origin (generally animal flours from carcasses), byproducts formed during synthesis of polyphosphates such as metal phosphates and ash from animal or vegetable matter. Phosphate rocks constitute a preferred source of insoluble phosphate.

Preferably, the phosphate rock or the phosphate starting material is ground before being incorporated in the reaction. The particle size resulting from grinding is not a limiting characteristic for application of the invention. However, the use of particles of which 80% have an average size below 100 microns is particularly advantageous in the context of the present invention.

The reaction by acid attack of the source of insoluble phosphate with the organic source is optionally carried out in the presence of a mineral or organic acid. In fact, if the organic source used is a raw organic matter that has been activated beforehand by an acid, it is not necessary to add acid again to be able to carry out acid attack of the source of insoluble phosphate. In all cases, a person skilled in the art will know whether or not the presence of an acid is required again for carrying out acid attack of the source of insoluble phosphate, and will adapt the required conditions accordingly, as described notably in "*The Fertilizer Manual*", KLUWER Academic Publisher, 1998.

In fact, in the field of the preparation of the phosphate compounds according to the invention, it is well known that it is necessary to have a reactive amount of acid to be able to carry out acid attack of the source of insoluble phosphate.

For this purpose, the total amount of acid present for carrying out acid attack of the source of insoluble phosphate, which is supplied both by the organic matter and notably the residual acidity resulting from preliminary activation of the latter, and by the free acid optionally added, is calculated directly as a function of the amount of insoluble phosphate supplied, the latter being notably based on its titer expressed as $P_2O_5$. Thus, a person skilled in the art is able to determine the need and the amount of acid required to meet the conditions for the reaction of acid attack and to meet the final technical characteristics of a marketable phosphate fertilizer, which are notably between 16% and 22% of water-soluble $P_2O_5$ for a single superphosphate and between 40% and 48% of water-soluble $P_2O_5$ for a triple superphosphate.

For example, for manufacture of a single superphosphate (in powder and/or granules), the ratio of the amount of insoluble phosphate for a $P_2O_5$ titer of 33% to sulfuric acid is about 1.60:

| | |
|---|---|
| Phosphate rocks (33% $P_2O_5$) | 626 kg |
| Sulfuric acid (96%) | 390 kg |

Nevertheless, further addition of acid for treating the source of insoluble phosphate is not ruled out. In this case, it is possible to add the same acid or mixture of acids as was used for activation of the organic source or else an acid or mixture of acids different from what was used for activation of the organic source.

Conversely, if the organic source used is not raw organic matter activated with an acid, it will be necessary to add acid in order to be able to carry out acid attack of the source of insoluble phosphate, as described above.

Thus, the expressions "optionally in the presence of one or more mineral acid(s) or of one or more organic acid(s)" or "optionally in the presence of an acid" that are used here signify that the phosphate compounds of the invention are obtainable, or even obtained or directly obtained, according to a method of preparation comprising reaction by acid attack on a source of insoluble phosphate with an organic source as described in paragraphs a) or b) above, it being understood that the presence of one or more mineral acid(s) or of one or more organic acid(s) is only necessary if the organic source used is in the raw form as defined in paragraph a) and is activated with an agent other than an acid.

The acids that can be used for acid attack of the source of insoluble phosphate for preparing the phosphate compounds according to the invention are the same as can be used for activating the organic source if necessary, i.e. when the latter is used in the raw state, i.e. directly in the natural state.

As mineral acid that can be used for preparing the phosphate compounds according to the invention, we may mention for example sulfuric, phosphoric, nitric, hydrochloric acid or mixtures thereof, preferably sulfuric acid, phosphoric acid or mixtures thereof.

Among the organic acids that can be used in the method of preparing the phosphate compounds according to the invention, we may also mention for example citric, oxalic, acetic, maleic, malonic, succinic, malic, fumaric, tartaric, pyruvic, oxaloacetic, ketogluconic, butyric, propanoic acid or mixtures thereof, preferably oxalic acid, citric acid or mixtures thereof.

The temperature and the pressure during the reaction for treatment of the source of insoluble phosphate do not represent limiting parameters, although the reaction is usually carried out at a temperature between room temperature (about 20 to 25° C.) and about 120° C., and at atmospheric pressure. Moreover, the reaction is generally carried out for a time from about 1 min to about 60 min, preferably from about 5 min to about 45 min, and especially preferably from about 15 min to about 30 min.

Preferably, the ingredients that are used during preliminary activation of the organic source used in the raw state for preparing the phosphate compounds according to the invention can be used in the following amounts:

from about 70 to about 98 wt. % of mineral or organic acid or of an alkaline solution, preferably from about 80 to about 95 wt. %, from about 1 to about 30 wt. % of organic source, preferably from about 5 to about 20 wt. %, (it being understood that the sum of these ingredients is equal to 100%).

The titers of the mineral and organic acids used for preparing the phosphate compounds according to the invention, and in particular as described above, are always of industrial grade, unpurified, i.e. for example from 78% to 93% purity for sulfuric acid, or from 75% to 85% purity for phosphoric acid.

When activation of the organic source in the raw state is carried out with an alkaline solution containing a chelating agent, the latter is preferably present at a concentration between 0.5% and 5%, it being understood that the sum of the ingredients: alkaline solution, chelating agent and organic source is equal to 100%.

Also preferably, during acid attack of the source of insoluble phosphate, the ingredients that are used for preparing the phosphate compounds according to the invention can be used in the following amounts:

from about 30 to about 50 wt. % of insoluble phosphate, preferably of phosphate rocks, preferably from about 35 to about 45 wt. %, and from about 50 to about 70 wt. % of raw organic matter activated by an acid, preferably from about 55 to about 65 wt. %, (it being understood that the sum of these ingredients is equal to 100%).

Preferably, the ingredients that are used during the reaction for preparing the phosphate compounds according to the invention can be used in the following amounts:

from about 40 to about 60 wt. % of crushed phosphate rocks, preferably from about 40 to about 55 wt. %, from about 30 to about 60 wt. % of mineral or organic acid, in particular sulfuric or phosphoric acid, preferably from about 37 to about 58 wt. %, and from about 0.2 to about 10 wt. % of organic source, preferably from about 2 to about 8 wt. %, (it being understood that the sum of these ingredients is equal to 100%).

Preferably, the compounds according to the invention are obtained (i) either by reacting phosphate rocks with raw peat previously activated with sulfuric or phosphoric acid, (ii) or by reacting phosphate rocks with sulfuric or phosphoric acid in the presence of humic acids extracted from leonardite or from peat.

The present invention will preferably be carried out in the absence of compounds that could prevent the formation of stable organo-calcium-phosphate complexes, for example compounds that have at least one free amine function or analogs thereof, which are capable of leading for example to the formation of amides or of bridges or bonds with the carboxyl functions of the organic matter. If such compounds are nevertheless present during application of the method according to the invention, their amount will have to be less than 5 wt. % relative to the weight of dry organic matter. In any case, the content of amine compounds or analogs must be less than, and not equal to, the content of carboxyl groups in the final product.

The concentration of organic matter present in the final product obtained is not a limiting characteristic, but preferably this concentration is between 2.5 and 25%.

According to a second aspect, the invention relates to a method for preparing phosphate compounds comprising reaction by acid attack on a source of insoluble phosphate with an organic source, optionally in the presence of one or more mineral acid(s) or of one or more organic acid(s), characterized in that said organic source consists of:

a) raw organic matter selected from lignite, leonardite, peat, plant composts, lignosulfonates not containing monovalent cations and algae, which is pretreated by an activation step consisting of liberating at least 10%, preferably at least 30% of the complexing functional groups present in the organic compounds, or b) organic compounds extracted from lignite, leonardite, peat, from plant composts, from lignosulfonates containing monovalent cations or from algae, and that have at least 10%, preferably at least 30% of free complexing functional groups.

The reactants used for carrying out this method (source of insoluble phosphate, mineral acid(s) and/or organic acid(s), and organic matter), as well as the preferred embodiments that are defined above for the phosphate compounds according to the invention are also applicable to the method of the present invention.

According to a third aspect, the invention relates to the use of one or more phosphate compounds that are obtained according to the method described above as fertilizer.

Following application of the method, the phosphate compounds are in the form of powder. However, for packaging and/or use thereof, the phosphate compounds resulting from the reaction can be presented in the form of powder, granules or pellets by methods of formulation that are well known in this field.

The amount of phosphate compounds according to the invention to be applied on the soil varies depending on the type of soils and crops, and the form in which these compounds are used.

For example, compounds containing 16 to 18% of water-soluble $P_2O_5$, in the form of powder or granules, will be applied in a range from 100 to 500 kg/hectare. A person skilled in the art will of course be able to adapt these parameters for using the compounds according to the invention.

The phosphate compounds resulting from the reaction according to the invention can be used alone or mixed with another fertilizer composition. In the latter case, they can notably be used as ingredients of a more complex fertilizer composition containing various nutrients (nitrogen, potassium, phosphorus, magnesium, calcium and trace elements, for example in nitrogen (N), phosphate (P), potassium (K), nitrogen-phosphate (NP), nitrogen-potassium (NK) and nitrogen-phosphate-potassium (NPK) fertilizers.

For example, the phosphate compounds according to the invention can be used mixed with an NPK fertilizer of composition 8% N, 15% P, 15% K, 2% MgO, 0.1% Cu and 0.1% Fe.

Production of the phosphate compounds according to the invention will be described in more detail in the following examples, which refer to the appended FIG. 1, which compares the X-ray diffraction analysis obtained with compounds (S18) that are superphosphates of the prior art, and with the phosphate compounds (T) according to the invention, comprising from 5% to 25% of organic matter.

EXAMPLES

Example 1

Figure 1:
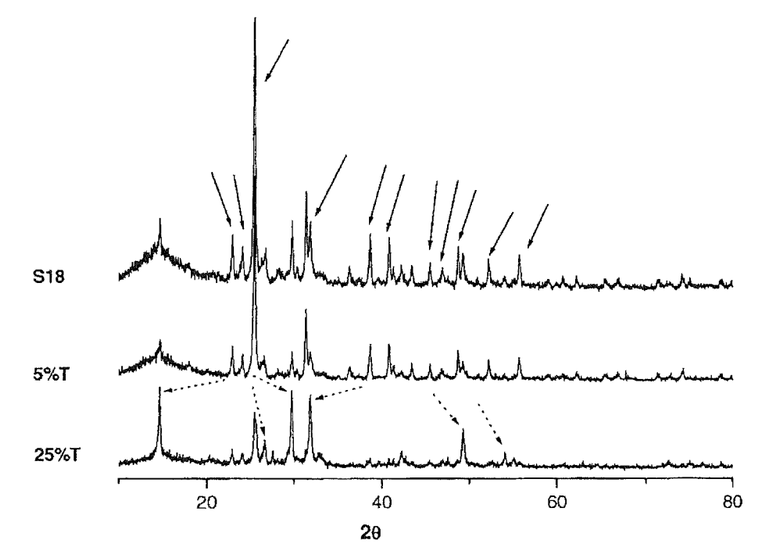

Production of Single Superphosphates According to the Invention

Pretreatment or Activation of the Organic Matter:
A suspension was prepared with 85 wt. % of sulfuric acid (at 70%) (Asturiana de Zinc, Spain), and 15 wt. % of black peat (30% moisture) (Tolsa, Spain). This suspension is stirred continuously for 15 minutes at ambient temperature (between 20 and 35° C.) before carrying out the reaction of attack of the insoluble phosphate. The black peat used comprises about 45% (percentage expressed as dry matter) of complexing functional groups (carboxyl, phenol and hydroxyl groups). After activation with sulfuric acid, the peat comprises about 36% of free complexing functional groups.

Attack of Insoluble Phosphate:
Then, the reaction with the source of insoluble phosphate was carried out by mixing 100 kg of phosphate rocks (of Moroccan origin) previously ground (80%<100 microns) with 100 kg of the suspension obtained previously (containing sulfuric acid and black peat) for about 30 s at 100° C., in a Kuhlman reactor for continuous reaction. The product obtained was put in a vat, where the reaction was carried out for about 25 min, then the product was stored.

Example 2

Production of Triple Superphosphates According to the Invention

Pretreatment or Activation of the Organic Matter:
A suspension was prepared by mixing 92% (w/w) of phosphoric acid (54% $P_2O_5$) (Fertiberia, Spain) and 8% (w/w) of black peat identical to that used in example 1 (30% moisture) (Tolsa, Spain). This suspension is stirred continuously for 15 minutes at ambient temperature (between 20 and 35° C.) before carrying out the reaction of attack of the insoluble phosphate.

Attack of the Insoluble Phosphate:
Then, the reaction with the source of insoluble phosphate was carried out by mixing 100 kg of phosphate rocks (of Moroccan origin) previously ground (80%<100 microns) with 125 kg of suspension prepared as described above (containing phosphoric acid and black peat) for about 30 s in a Kuhlman reactor for continuous reaction. The product obtained was put in a vat, where the reaction was carried out for about 25 min, then the product was stored.

Example 3

Production of Single Superphosphates According to the Invention

Pretreatment or Activation of the Organic Matter:
A suspension was prepared by mixing 85% (w/w) of sulfuric acid (at 70%) (Asturiana de Zinc, Spain) and 15% (w/w) of calcium lignosulfonate (Novibond®). This suspension is stirred continuously for 15 minutes at ambient temperature (between 20 and 35° C.) before carrying out the reaction of attack of the insoluble phosphate. After activation with sulfuric acid, the calcium lignosulfonate comprises about 90% of free complexing functional groups.

Attack of the Insoluble Phosphate:
Then, the reaction with the source of insoluble phosphate was carried out by mixing 100 kg of phosphate rocks (of Moroccan origin) previously ground (80%<100 microns) with 100 kg of the suspension obtained previously (containing sulfuric acid and calcium lignosulfonate) for about 30 s, in a Kuhlman reactor for continuous reaction. The product obtained was put in a vat, where the reaction was carried out for about 25 min, then the product was stored.

Example 4

Production of Single Superphosphates According to the Invention

Attack of Insoluble Phosphate:
The reaction with the source of insoluble phosphate was carried out by mixing, for about 30 s, in a Kuhlman reactor for continuous reaction, 100 kg of phosphate rocks (of Moroccan origin) previously ground (80%<100 microns) with 85 kg of sulfuric acid (at 70%) (Asturiana de Zinc, Spain), and 10 kg of humic acids previously extracted from 30 kg of leonardite (Luengo, Spain) using 100 kg of a soda solution at 5% for 2 h. The humic acids were then extracted by acidification of the reaction mixture; these humic acids comprise at least 90% of free complexing functional groups.

The product obtained was put in a vat, where the reaction was carried out for about 25 min, then the product was stored.

Example 5

Demonstration of the Formation of Organo-Calcium-Phosphate Complexes in the Phosphate Compounds According to the Invention Various phosphate compounds were synthesized:
(T): phosphate compounds prepared according to the invention as in example 1;
(P): phosphate compounds prepared according to the following protocol: 100 kg of phosphate rock (of Moroccan origin) previously ground (80%<100 microns), 85 kg of sulfuric acid (at 70%) (Asturiana de Zinc, Spain) and 15 kg of peat are mixed simultaneously in a Kuhlman reactor for continuous reaction for 30 seconds and with vigorous stirring, at a temperature of about 100° C.;

(M): superphosphate compound S18 mixed with peat in S18:peat ratio of 97.5:2.5 by simple mixing. The superphosphate S18 is obtained by mixing 100 kg of phosphate rocks (of Moroccan origin) previously ground (80%<100 microns) and 85 kg of sulfuric acid (at 70%) (Asturiana de Zinc, Spain) simultaneously in a Kuhlman reactor for continuous reaction for 30 seconds and with vigorous stirring, at a temperature of about 100° C.;

(S18): superphosphate compound S18.

The formation of organo-calcium-phosphate complexes is monitored by $^{13}$P NMR for each of the phosphate compounds synthesized above (T), (P), (M) and (S18), according to the technique described by Riggle and Von Wandruszka, Talanta, 2007, 73, 953-958. This monitoring is based on the fact that formation of this type of complex affects the width of the peak corresponding to inorganic phosphate owing to the occupation of coordination sites of the phosphate by the cation.

The results are presented in Table 1 below and clearly demonstrate that formation of organo-calcium-phosphate complexes only takes place when the phosphate compounds are obtained according to the invention and that in the conditions that correspond to the methods of the prior art notably do not permit formation of these complexes.

TABLE 1

| Product | Δ peak width/inorganic phosphate ΔHz (½ height) |
|---|---|
| T | 88 |
| P | 0 |
| M | 0 |
| S18 | 0 |

(ΔHz (½ height) represents peak half-height).

Example 6

Effect of the Phosphate Compounds on Phosphate Bioavailability

The bioavailability of the phosphate in the soil was measured after using each of the phosphate compounds prepared as indicated in Example 5 above.

Each of the compounds (T, P, M, S18), was added at a rate of 250 mg of phosphorus per kg of soil, and mixed, in separate 300-mL plastic pots containing 150 g of calcareous soil. A 300-mL plastic pot containing 150 g of untreated calcareous soil was used as a control.

The treated soil samples were homogenized and type I deionized water was added in order to reach the capacity in the field (i.e. the maximum water retention capacity of the soil), determined beforehand on a column of moistened calcareous soil, which was left to seep freely. The pots were sealed hermetically and were kept at room temperature in the dark for 90 days. Three samples were taken per pot 20, 30, 60 and 90 days after the start of the experiment, and were dried before the analysis. The phosphate bioavailability of the soil is determined according to Olsen's method, which is a method used conventionally for evaluating the degree of bioavailability of phosphate in soils (Rowell D. L., Longman, UK, 1994, *Soil Science, Methods and Applications*).

The results are presented in Table 2 below and clearly show the beneficial effect that the phosphate compounds prepared according to the present invention have on the bioavailability of phosphate in the soil relative to the compounds prepared according to the prior art.

TABLE 2

| Product | P in the soil (mg kg$^{-1}$) |
|---|---|
| T | 91 |
| P | 42 |
| M | 26 |
| S18 | 45 |

Example 7

Effect of the Phosphate Compounds for Phosphate Fertilizing

The effect of the compounds of the invention was investigated on pot-grown plants, sown in clay-lime soil poor in $P_2O_5$.

For this purpose, twenty 5-liter pots were filled with clay-lime soil poor in $P_2O_5$ (clay: 38.4%–limestone: 14.1%; high fixing power for $P_2O_5$; low Joret phosphorus content: 69 ppm (normal value 90) and Olsen phosphorus content: 4 ppm (normal value 40)).

Phosphate compounds prepared according to the invention as in example 1 (T) were incorporated in 8 pots, at a dose equivalent to 160 U/ha, in 8 other pots the superphosphate compound S18 (S18) at the same dose, the remaining 4 pots serving as control. Then 5 g of Italian ryegrass (*Lolium multiflorum*) was sown in each pot, and after waiting for the plants to come up (after about 5 days), the pots were put in a greenhouse and a nitrogen solution was added, equivalent to 50 U/ha.

Three weeks after putting in the greenhouse, a first pruning was carried out, and nitrogen solution equivalent to 100 U/ha was added to the pruned plants. 16 days after the first pruning, a second pruning was carried out and nitrogen solution equivalent to 200 U/ha was added to the pruned plants. 4 days after the second pruning, a third pruning was carried out and nitrogen solution equivalent to 200 U/ha was added to the pruned plants. A last pruning was carried out 16 days later.

The production of fresh matter (FM) and of dry matter (DM) was weighed after each pruning. The results are presented in Tables 3 and 4 below.

TABLE 3

| | Cumulative production FM g/pot | | | |
|---|---|---|---|---|
| | Pruning 1 | Pruning 1 + 2 | Pruning 1 + 2 + 3 | Pruning 1 + 2 + 3 + 4 |
| Control* | 12.38 | 19.95 | 23.72 | 28.54 |
| S18** | 15.48 | 47.30 | 56.67 | 64.98 |
| T** | 14.05 | 44.38 | 58.12 | 72.06 |

*average for 4 pots
**average for 8 pots

TABLE 4

| | Cumulative production DM g/pot | | | |
|---|---|---|---|---|
| | Pruning 1 | Pruning 1 + 2 | Pruning 1 + 2 + 3 | Pruning 1 + 2 + 3 + 4 |
| Control* | 1.81 | 3.16 | 4.13 | 5.21 |
| S18** | 2.14 | 7.00 | 8.72 | 10.68 |
| T** | 1.96 | 6.50 | 8.71 | 11.53 |

*average for 4 pots
**average for 8 pots

As can be seen from Tables 3 and 4, in 4 prunings, the compounds according to the invention produce 10.9% more FM, and 7.9% more DM, than the S18 treatment. The effect is apparent after the second pruning; based on 100 for S18, the production of DM for the pots treated with the compounds of the invention is 128% ($p<0.05$) at the third pruning and 144% ($p<0.05$) at the fourth pruning.

The invention claimed is:

1. A method for preparing phosphate compounds comprising the steps of:
    a) activating raw organic matter selected from the group consisting of lignite, leonardite, peat, plant composts, lignosulfonates not containing monovalent cations, and algae, wherein the activation is carried out by reacting:
        (i) from about 70 wt % to about 98 wt % of an organic or inorganic acid, with
        (ii) from about 2 wt % to about 30 wt % of said raw organic matter, such that at least 10% of complexing functional groups present in the raw organic matter are freed, and
    b) reacting:
        (i) from about 30 wt % to about 50 wt % of a source of insoluble phosphate, with
        (ii) from about 50 wt % to about 70 wt % of the activated raw organic matter obtained in step a).

2. The method of claim 1, wherein the raw organic matter is selected from the group consisting of peat, leonardite, lignite and plant composts.

3. The method of claim 2, wherein the raw organic matter is peat.

4. The method of claim 1, wherein the complexing functional groups present in the raw organic matter are selected from the group consisting of carboxyl groups, phenol groups and hydroxyl groups.

5. The method of claim 1, wherein the inorganic acid is selected from the group consisting of sulphuric acid, phosphoric acid, nitric acid hydrochloric acid and mixtures thereof.

6. The method of claim 5, wherein the inorganic acid is sulphuric acid, phosphoric acid or a mixture thereof.

7. The method of claim 1, wherein the organic acid is selected from the group consisting of citric acid, oxalic acid, acetic acid, maleic acid, malonic acid, succinic acid, malic acid, fumaric acid, tartaric acid, pyruvic acid, oxaloacetic acid, ketogluconic acid, butyric acid, propanoic acid and mixtures thereof.

8. The method of claim 7, wherein the organic acid is oxalic acid, citric acid or a mixture thereof.

9. The method of claim 1, wherein the source of insoluble phosphate is selected from the group consisting of phosphate rocks, byproducts of animal origin, and byproducts formed during synthesis of polyphosphates.

10. The method of claim 9, wherein the source of insoluble phosphate consists of phosphate rocks.

11. A method for preparing phosphate compounds comprising the steps of reacting:
    (i) from about 40 wt % to about 60 wt % of phosphate rocks,
    (ii) from about 30 wt % to about 60 wt % of an organic or inorganic acid, and
    (iii) from about 0.2 wt % to about 10 wt % of organic compounds extracted from lignite, leonardite, peat, plant composts, lignosulfonates containing monovalent cations and algae, wherein said organic compounds comprise at least 10% of free complexing functional groups.

12. The method of claim 11, wherein the complexing functional groups present in the organic compounds are selected from the group consisting of carboxyl groups, phenol groups and hydroxyl groups.

13. The method of claim 11, wherein the inorganic acid is selected from the group consisting of sulphuric acid, phosphoric acid, nitric acid hydrochloric acid and mixtures thereof.

14. The method of claim 13, wherein the inorganic acid is sulphuric acid, phosphoric acid or a mixture thereof.

15. The method of claim 11, wherein the organic acid is selected from the group consisting of citric acid, oxalic acid, acetic acid, maleic acid, malonic acid, succinic acid, malic acid, fumaric acid, tartaric acid, pyruvic acid, oxaloacetic acid, ketogluconic acid, butyric acid, propanoic acid and mixtures thereof.

16. The method of claim 15, wherein the organic acid is oxalic acid, citric acid or a mixture thereof.

\* \* \* \* \*